METHOD FOR THE PREPARATION OF THERMOGRAPHIC OFFSET MASTERS

Filed Sept. 9, 1964

INVENTOR
Frederich O. Back
by McDougall, Hersh and Scott
Att'ys

United States Patent Office 3,256,811

Patented June 21, 1966

3,256,811

METHOD FOR THE PREPARATION OF THERMOGRAPHIC OFFSET MASTERS

Frederick O. Bach, Villa Park, Ill., assignor to A. B. Dick Company, Niles, Ill., a corporation of Illinois Filed Sept. 9, 1964, Ser. No. 395,268

7 Claims. (Cl. 101—149.2)

This invention relates to methods for preparing offset masters through the use of thermographic techniques. In particular, the invention is concerned with techniques suitable for the preparation of a master by exposing the master to a heat pattern as can be accomplished by irradiation of an original placed in contact with an offset or thermographic plate.

This invention will be particularly described with reference to a lithographic plate which can be directly imaged by exposing the plate to a heat pattern. When the plate is so imaged, the invention provides for the fixing of an ink receptive, hydrophilic material on the plate corresponding to the pattern whereby copy can be produced in accordance with standard lithographic practice.

Use has previously been made of thermographic techniques for the imaging of a plate directly from an original with the original being located whereby radiations are directed onto the original. The non-image areas of the original transmit or reflect the radiations; however, the image areas absorb the radiations whereby a heat pattern is developed. Since the plate is thermosensitive, the heat will affect the plate surface whereby a pattern corresponding to the image areas will be formed.

In prior procedures, use has been made of a separate transfer sheet containing a transfer coating of an ink receptive, water repellent inking material. This transfer sheet is interposed between the original and the lithographic surface of the plate whereby the heat pattern which is developed upon irradiation of the original causes fusion of the imaging material. The fused portions of the imaging material are displaced to the lithographic plate to form ink receptive, water repellent images on the lithographic surface.

In applicant's copending application, Ser. No. 105,188, filed Apr. 24, 1961, issued as U.S. Patent 3,156,183, on Nov. 10, 1964, and entitled "Thermographic Offset Master and Method of Use," there is described a technique wherein the transfer sheet can be eliminated. In this system, the original is placed in surface contact with the coated side of a lithographic plate with the coating being formed of a water repellent, ink receptive imaging material. When a heat pattern is formed, the material on the plate surface is fused to provide corresponding image areas. In the non-image areas, a treatment is undertaken for removal of the coating from the lithographic plate.

In a system employing a transfer sheet, certain disadvantages result. Thus, it has been recognized that there is an excessive spread of the heat pattern so that poor copy quality and definition is realized. In addition, the transfer sheet can be used only once and this adds to the cost of the procedure. The transfer sheet requires additional handling steps and raises problems of storage and inventory.

The procedure described in the above noted copending application has been susceptible to some difficulties primarily involving scratching and removal of the coating from the plate during handling. In addition, certain coatings illustrate a tendency to become extremely difficult to remove from the non-image areas after long shelf aging or due to exposure to heat during storage.

It is one object of this invention to produce an offset master which is adapted to be imaged directly by lithographic technique from an original without the use of a transfer sheet.

It is a further object of this invention to produce an offset master which is simple in construction and which can be economically imaged by irradiation of an original directly in contact with the master.

It is a still further object of this invention to provide an offset master of the type described which can be prepared by the user whereby the master can be employed with a minimum of handling to avoid scratching and removal of a coating thereon and whereby long storage times and exposure to unsuitable conditions are eliminated.

These and other objects of this invention will appear hereinafter and for purposes of illustration, but not of limitation, specific embodiments of this invention are shown in the accompanying drawing in which.

The instant invention is generally concerned with techniques for preparing thermographic offset masters. In such techniques, a master is formed by first providing a static charge on the surface of the master sheet. The surface is then produced with an ink receptive thermographic powder adapted to adhere to the surface by reason of the presence of the charge thereon.

With the surface coated with thermographic powder, an original can be placed adjacent the surface and the assembly can be irradiated as by means of an infra-red source. The original will generally be of a type having infra-red transmitting or reflecting areas and infra-red absorbing areas, the latter corresponding to the image portions. During exposure to the radiations, heat is generated in the image areas, and this heat fixes the adjacent thermographic material on the master sheet in the image areas. Thereafter, the material in the non-image areas can be readily removed from the surface of the master.

The master sheet is originally selected whereby its surface will be hydrophilic and ink repellent. Accordingly, the non-image areas in the completed master will comprise hydrophilic ink repellent areas surrounding the ink receptive image areas.

The accompanying drawings illustrate one proposed system for producing offset masters in accordance with this invention. In the described arrangement, a corona discharge element 10 is operated to form a static charge 12 on the sheet 14. It will be appreciated that the sign of the charge and the means for producing the charge are not critical to the instant invention. It is only essential that a charge be produced which will retain an ink receptive thermographic powder when this powder is distributed over the charged surface of the sheet 14.

Figure 1:
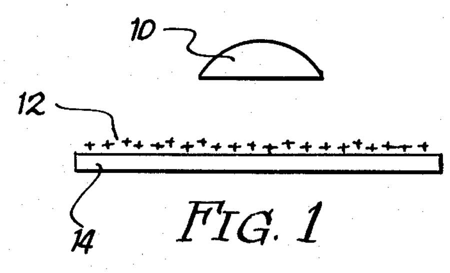
FIGURE 1 is a diagrammatic illustration of the procedure employed for charging the surface of a sheet construction in preparing the master of this invention.
Figure 2:
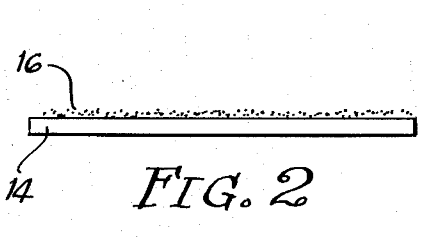
FIGURE 2 is a diagrammatic illustration of the sheet after provision of a suitable coating thereon; and, FIGURE 3 is a diagrammatic illustration of the irradiation of an assembly including an original and the master of this invention.

FIGURE 2 illustrates powder 16 which has been dusted over the surface of the sheet 14. This powder may be characterized by an opposite charge or by a neutral charge which in either case will cause the powder to adhere to the sheet 14.

Figure 3:
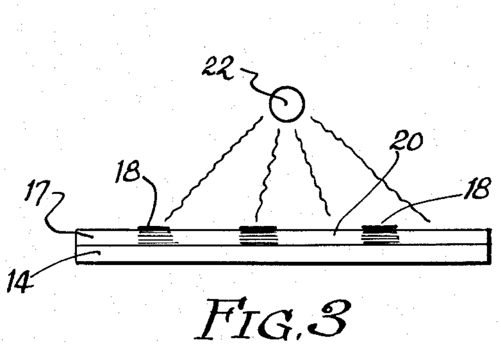

In FIGURE 3, there is illustrated an original 17 overlying the sheet 14 of FIGURE 2. The original is provided with image areas 18 which are radiation absorbing and which are surrounded by radiation transmitting areas 20. When the source of radiations 22, which may be an infra-red lamp, is operated, heat is generated whereby the thermographic particles on the surface of the sheet 14 are fixed in areas corresponding to the images 18.

To complete the formation of the master, the original is separated and the thermographic material in the non-image areas is removed by any conventional techniques. This can be accomplished by exposing the sheet to a surface of opposite charge to attract the particles away from the sheet 14. Liquid materials or mechanical means are also contemplated as suitable for removal of the particles from the non-image areas.

In one example of the practice of this invention, a lithographic plate was exposed to a corona discharge and carnauba wax was dusted onto the surface of the plate. The plate was a typical lithographic, ink repellent, water receptive, base plate. The amount of wax employed was about 1½ pounds per 3000 square feet of surface area.

Subsequent to the described preparation of the plate surface, the master was imaged by placing an original in contact with the dusted surface and passing the assembly through a mechanism which exposes the assembly to infra-red radiations. The wax coating in the non-image areas was removed by conventional etching with commercial blue etch. Thereafter, several hundred legible copies were provided by running the master in a normal manner on an offset press.

In a second example, powdered "Polymekon" wax was adhered to a surface which had been exposed to a corona discharge. After removal of the wax from non-image areas by the etching technique, the master was imaged and run in the same manner with the production of several hundred legible copies.

As the water receptive, ink repellent lithographic base, use can be made of a sheet of metal, such as aluminum, zinc, copper or the like amphoteric metal, in which the surface is preferably etched, silicated or otherwise treated to enhance the ink repellent, water receptive, lithographic characteristics of the surface. A non-conductive hydrophilic coating should be selected for treating such metal surfaces to provide a surface adapted to hold a charge for a sufficient period of time. Instead, use can be made of less expensive and more flexible plates such as are fabricated of paper base sheets provided with a relatively non-absorbent, water receptive, ink repellent, lithographic coating such as may be formulated of casein, as described in the Worthen Patent No. 2,534,650; alginate, as described in the Ensink Patent No. 2,835,576; carboxymethyl cellulose, as described in the Van Dusen Patent No. 2,542,784; polyacrylate, as described in the Beatty Patent No. 2,760,431, or partially hydrolyzed cellulose acetate. By way of further modifications, the lithographic base may be constructed of a thin film of metal of the type described above laminated onto a suitable paper base sheet as the carrier. Where such conductive films are used, it is necessary to provide a non-conductive coating as above described.

Instead of the waxes described, use can be made of other oleaginous, ink receptive, water repellent imaging materials capable of being subdivided into a particulate or powdered substance for distribution onto the charged lithographic surface. Representative of suitable materials capable of use in substitution for the waxes in the above examples are castor wax, sugar cane wax, shellac wax, fatty acid soaps such as zinc, aluminum, barium and the like stearates, palmitates, etc. The powders are applied in amounts up to about 1.5 pounds per 3000 square feet of base. A lower limit cannot be practically recited in view of the fact that a uniform distribution is all that is required, and amounts which are immeasurable as a practical matter but which form such a continuous distribution are completely suitable for the purposes of this invention. The greater amount of particles are employed where the base is of an absorbent character so that a sufficient film will remain on the base after the imaging operation.

In considering the above comments concerning the lithographic plate, it will be appreciated that the plate employed must be capable of holding at least temporarily a static charge. Similarly, the powdered material employed as the thermographic material must be adapted to adhere to the plate by reason of the presence of the static charge thereon.

The advantages of the techniques described above are believed to be apparent. It is particularly important to consider that the masters of this invention can be prepared with a minimum of effort by a user. This, of course, completely eliminates any decrease in capabilities by reason of over extended storage or due to exposure to unsuitable temperature and atmospheric conditions. Furthermore, the steps involved in preparing the masters are elementary in nature and they do not require extensive equipment.

The procedures of this invention exclude the use of compositions for dusting onto the surface of the plate 14 which absorb undue amounts of radiations. With such compositions, the entire layer of thermographic material would tend to be reduced to a fused state and would fix itself to the master. Although some absorption can be tolerated, use is to be made of materials wherein the amount of absorption will be insufficient to cause an increase in temperature to the fused state of any material in the thermographic coating.

Description has been made of the use of infra-red for radiation; however, it will be understood that other radiations which operate to develop heat upon absorption by image areas in an original are contemplated. Furthermore, the heat pattern applied to cause fusion of the coating may be generated by techniques other than those specifically described.

In the above examples and in the drawings, the original is depicted as one transmitting the radiations rather than reflecting the radiations. It will be apparent, however, that the use of an infra-red transparent master which is exposed via reflex is clearly suitable for the purposes of this invention. The lithographic coatings for paper base sheets referred to above can be provided on a suitable film, such as cellulose acetate, to produce a satisfactory reflex master.

It will be understood that changes and modifications may be made in the procedures of this invention which provide the characteristics of this invention without departing from the spirit thereof particularly as defined in the following claims.

That which is claimed is:

1. A method for the preparation of a thermographic offset master comprising the steps of providing a master sheet, forming a static charge on a surface of said master sheet, dusting the charged surface with an ink receptive, thermographic powder which will adhere to the surface due to the presence of said charge thereon, exposing said surface to a heat pattern whereby said powder will be fixed to the surface in areas corresponding to the pattern, and removing the unfixed powder from said surface.

2. A method in accordance with claim 1 wherein said static charge is formed by exposing said sheet to a corona discharge.

3. A method in accordance with claim 1 wherein the exposing of said surface to a heat pattern is undertaken by placing an original having infra-red absorbing areas thereon adjacent said surface, and exposing the assembly to infra-red radiations whereby heat is generated by said image areas to provide for fixing of said powder on said surface in areas corresponding to said image areas.

4. A method in accordance with claim 1 wherein said powder is selected from the group consisting of waxes and resins which are ink receptive and which will be fixed to said surface as a result of heat generated by infra-red radiations.

5. A method for the preparation of a thermographic offset master comprising the steps of providing a hydrophilic ink repellent master sheet, exposing said sheet to a corona discharge to provide for the formation of a static charge on a surface of said sheet, dusting the charged surface with an ink receptive, thermographic powder which will adhere to the surface due to the presence of said charge, exposing said surface to a heat pattern whereby said powder will be fixed to the surface in areas corresponding to the patterns, and removing the unfixed powders from said surface.

6. A method in accordance with claim 5 wherein the exposing of said surface to a heat pattern is undertaken by placing an original having infra-red absorbing areas thereon adjacent said surface, and exposing the assembly to infra-read radiations whereby heat is generated by said image areas to provide for fixing of said powder on said surface in areas corresponding to said image areas.

7. A method in accordance with claim 6 wherein said powder is selected from the group consisting of waxes and resins which are ink receptive and which will be fixed to said surface as a result of heat generated by infra-red radiations.

References Cited by the Examiner

UNITED STATES PATENTS

| | | | |
|---|---|---|---|
| 2,885,955 | 5/1959 | Vyverberg ------ | 101—149.2 X |
| 2,895,847 | 7/1959 | Mayo. | |
| 2,993,787 | 7/1961 | Sugarman. | |
| 3,132,963 | 5/1964 | Jarvis. | |

DAVID KLEIN, *Primary Examiner.*